INVENTOR.
O.E. LARSEN

BY Hudson and Young

ATTORNEYS

Dec. 19, 1961  O. E. LARSEN  3,013,925
METHOD AND MEANS FOR WELDING THERMOPLASTIC PIPES
Filed April 3, 1959  2 Sheets-Sheet 2

INVENTOR.
O. E. LARSEN
BY Hudson and Young
ATTORNEYS

United States Patent Office
3,013,925
Patented Dec. 19, 1961

3,013,925
METHOD AND MEANS FOR WELDING
THERMOPLASTIC PIPES
Olaf E. Larsen, Bartlesville, Okla., assignor to Phillips Petroleum Company, a corporation of Delaware
Filed Apr. 3, 1959, Ser. No. 804,031
4 Claims. (Cl. 156—153)

This invention relates to butt-welding of thermoplastic pipes. In one aspect the invention relates to an improved method and means for butt-welding thermoplastic pipes. In another aspect the invention relates to a method and means for preventing the formation of an objectional bead on the inside of a welded thermoplastic pipe.

The use of thermoplastic materials for the fabrication of pipes for fluid conducting systems has increased, particularly in those instances where fluids which are corrosive to metals are to be transported. A more complete conversion from metal pipes to thermoplastic pipes has been retarded by the lack of a satisfactory method for coupling joints of thermoplastic pipe. Due to cold-flow and notch-sensitivity characteristics of many thermoplastic materials employed for this purpose, conventional threaded couplings have been found completely unsatisfactory and it has been necessary to weld the joints of pipe together to form a satisfactory fluid-tight connection. Methods for forming joints or welds in thermoplastic pipes have included the fusing of a welding rod of the thermoplastic material into a groove formed by the abutment of two tube ends having the outside edges beveled, and the method of heating the ends of the tube sections and bringing the heated ends together while in a softened condition so as to form a weld upon cooling of the material. These prior art methods have not been entirely satisfactory for the reason that considerable skill is required in achieving a fluid-tight weld, the weld is oftentimes weaker than the remaining sections of pipe, and the welding operation is time-consuming. Furthermore, the method of softening the ends of the pipe and forcing the softened ends together has resulted in the formation of a bead on the inside and on the outside of the pipe which affects the flow of fluid through the pipe and also renders the joint subject to failure from notch-sensitivity characteristics of the material which are aggravated by the rough and irregular bead at the weld.

It is therefore a principal object of this invention to provide a method for effecting a weld between two joints of pipe wherein the bead on the inside of the pipe is substantially eliminated. Another object of this invention is to provide a method for effecting a weld between two joints of thermoplastic pipe wherein the bead on the outside conforms to a configuration in which sharp angles are avoided. Still another object of this invention is to provide a means to aid in the carrying out of the method of this invention for forming a weld between two joints of pipe. Other and further objects and advantages of this invention will become apparent to one skilled in the art upon study of the present disclosure including the detailed description of the invention and the drawing wherein:

According to the invention, the inside of each end of the joints of pipe to be joined is beveled and the ends of the pipe are heated, for example by pressing the ends of the pipes against a heated plate, after which the ends of the pipe are forced together so that the flow of softened material is to the outside of the pipe and a weld is effected substantially without the formation of a bead on the inside of the pipe. Further, according to the invention, the pipes are confined in a pair of dies having the inside edges recessed so that when the heated ends of the pipes are forced together the recessed ends of the dies form a chamber into which the softened plastic material can flow so as to form a bead on the outside of the pipe having a predetermined configuration. The bevel on the inside ends of the pipe will be preferably about 30 degrees with respect to the outside surface of the pipe, or in other words, with respect to a line parallel to the longitudinal axis of the pipe; however, the amount of bevel can vary widely from 30 degrees depending on the desired size of the exterior bead; the smaller the angle is the larger the bead will be. A reamer having an included angle of 120° will provide a bevel of 30°. The bevel will preferably be in the range of about 20 to about 50°.

The procedure according to the method of the invention is to ream the ends of the pipe to obtain the desired bevel in the pipe ends and to position the pipe ends in the dies so that the pipe protrudes through the die end of the clamping ring by about the amount of thermoplastic required to fill the mold space of the clamping ring which will usually be the amount of the bevel. The ends of the pipe are then heated, for example, by pressing the ends against a heated plate, until the thermoplastic material is softened to the end of the bevel on the inside of the pipe. The heated plate is then removed and the pipe ends are brought together so that the die rings meet and the softened thermoplastic is squeezed into the mold space which forms the external bead on the pipe.

The recessed ends of the dies are constructed so that the bead on the outside surface of the pipe is streamlined with respect to the pipe surface so that sharp angles are avoided.

Figure 1:
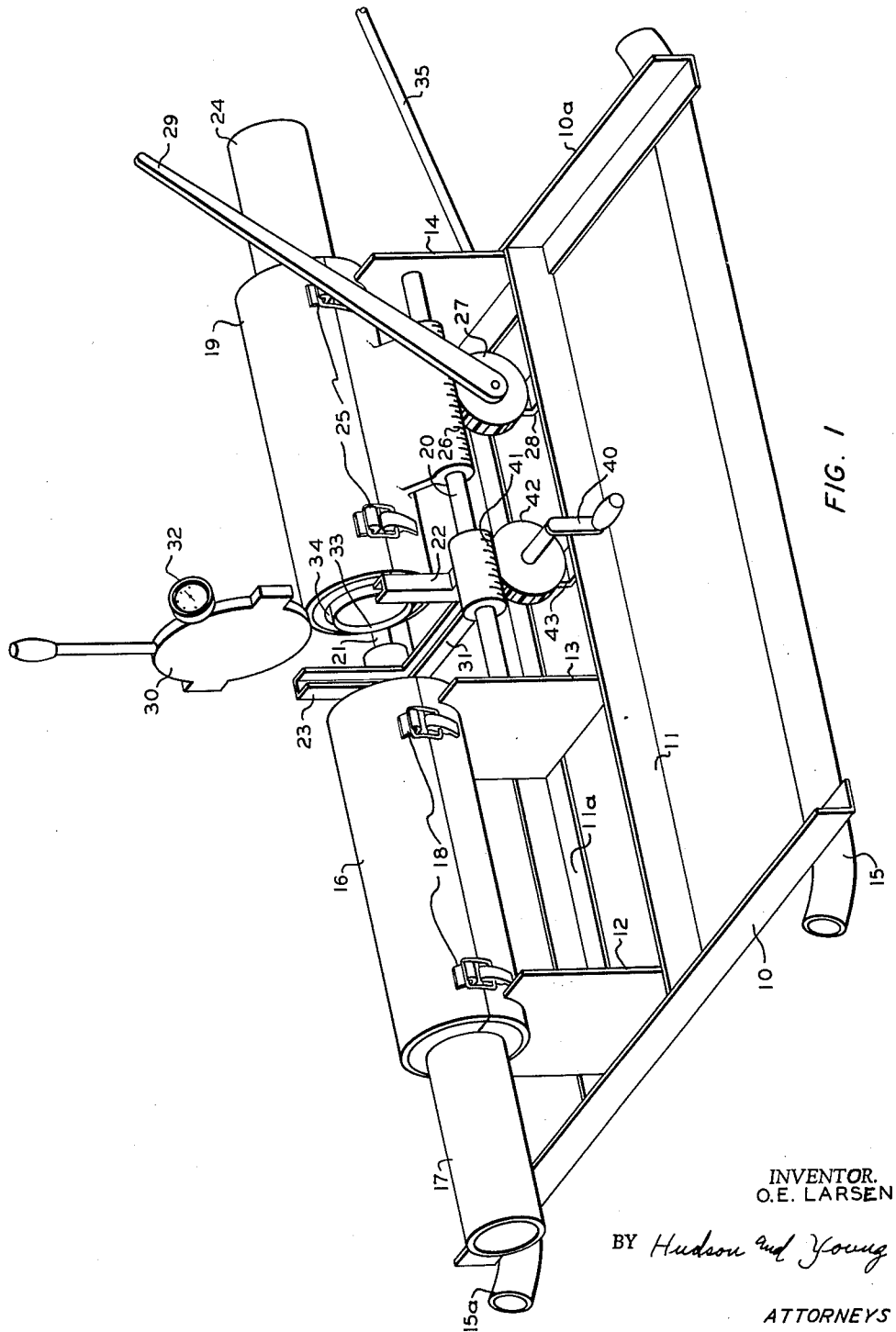
FIGURE 1 is an isometric view of a device adapted for welding thermoplastic pipe and embodying therein the means for carrying out the present invention.

Referring now to the drawing, and particularly to FIGURE 1, there is illustrated a device in which the apparatus of this invention is used. A frame comprising lateral members 10 and 10a; longitudinal members 11 and 11a; and support plates 12, 13 and 14 are positioned on skids 15 and 15a. Wheels can be employed instead of skids 15 and 15a, if desired. Stationary die clamp 16 is secured to support plates 12 and 13 and is adapted to be clamped securely around the pipe 17 by means of latches 18. Pipe 17 represents the pipe line already laid. Movable die clamp 19 is slidably mounted on guide rods 20 and 21 which are secured to support plates 13 and 14. Die clamp 19 is adapted to be secured about pipe 24 by means of clasps 25. Pipe 24 represents the joint added to the pipe line. Movable die clamp 19 is caused to travel on guide rods 20 and 21 by means of rack 26 secured to die clamp 19 and mounted on guide rod 20, and pinion 27 secured to frame member 11 by element 28. The rack and pinion are actuated by a lever 29 secured to the pinion 27.

A frame comprising support members 22 and 23 and stop member 31 is also slidably mounted on guide rods 20 and 21 so that the ends of pipes 17 and 24 can both be pressed toward a heating or reaming means.

Support members 22 and 23 serve as guide rails for heating element 30 which rests on stop 31 when in position for heating the ends of pipes 17 and 24. Heating plate 30 is used to provide the source of heat for softening the ends of pipes 17 and 24 and can be heated by any means such as steam, electricity, an open flame, or any other convenient means for raising the temperature of the plate to a required value which can be indicated by a thermometer such as thermometer 32.

The frame comprising guide members 22 and 23 and stop 31 is slidably mounted upon guide rods 20 and 21 and can be moved toward either die clamp 16 or die clamp 19 by operating handle 40 so as to operate rack 41 and pinion 42. Pinion 42 is secured to the frame member 11 by member 43 and rack 41 is a part of the frame comprising guide rails 22 and 23 and the stop member 31.

The ends of the pipes 17 and 24 are beveled as indicated at 33 and the die clamps 16 and 19 are recessed as indicated at 34 to provide a mold for the softened plastic material to compel the bead on the outside of the welded pipe to conform to the desired configuration.

Figure 2:
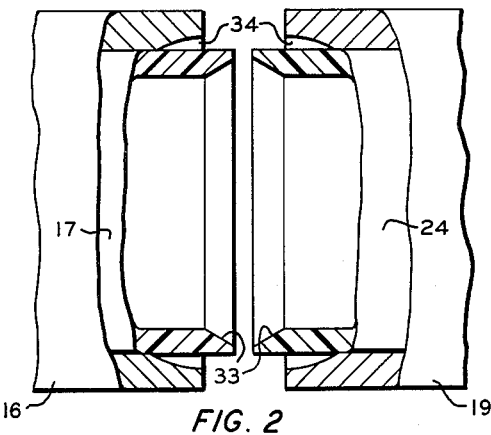
FIGURE 2 shows, in partial cross section, two adjacent ends of thermoplastic pipe to be welded and the die for effecting the weld according to the invention.

Referring now to FIGURE 2, the pipes 17 and 24 are shown positioned in the die molds 16 and 19 with the end of the bevel within the pipe end substantially lined up with the faces of the die molds 16 and 19, respectively.

Figure 3:
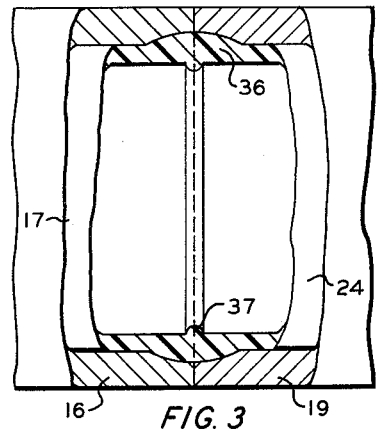
FIGURE 3 shows the elements of FIGURE 2 after the weld has been effected.

FIGURE 3 shows the completed weld with die clamps 16 and 19 butted together after the ends of pipes 17 and 24 have been softened by heating plate 30. The mold formed by recesses 34 in die clamps 16 and 19 is shown filled with plastic material indicated at 36 and forming an outside bead around the junction of pipes 17 and 24, with substantially no bead at 37.

Figure 4:
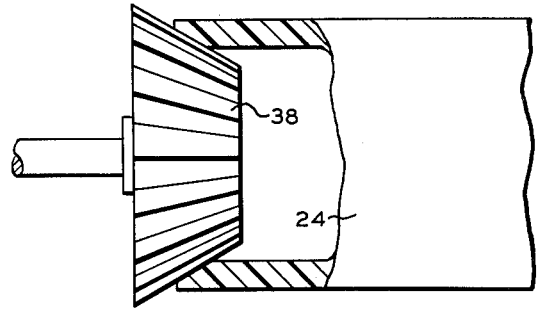
FIGURE 4 illustrates a reamer for beveling the ends of thermoplastic pipe in accordance with this invention.

FIGURE 4 shows a reamer 38 being used to bevel the inside of an end of pipe such as pipe 24.

Figure 5:
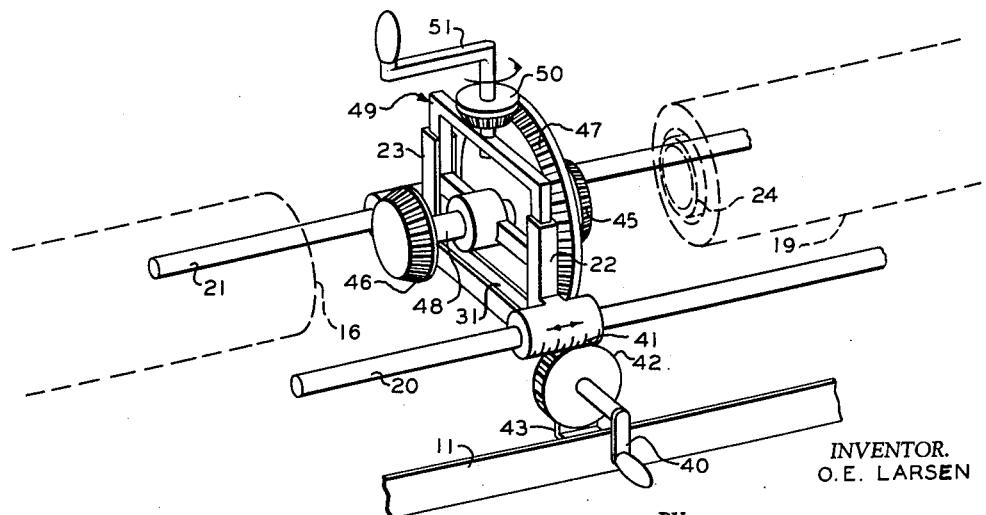
FIGURE 5 illustrates a reamer incorporated into the device for effecting the weld.

FIGURE 5 shows a modification of the device of this invention wherein reamers 45 and 46 and gear wheel 47 are secured to a shaft 48 and the assembly is rotatably mounted in a frame 49 adapted to fit into guide rails 22 and 23 of the device shown in FIGURE 1. Gear wheel 50 is also attached to framework 49 in engagement with gear wheel 47 and is rotated by means of handle 51.

Thermoplastic materials to which the invention can be applied include linear polymers and copolymers of vinylidene chloride, polymerized methyl methacrylate, polystyrene, linear polymers of ethylene, linear copolymers of ethylene and propylene, and the like. Although the method of the invention has utility in butt-welding pipe joints of thermoplastic materials in general, it is particularly applicable for butt-welding pipe joints made from linear polymers of ethylene.

Linear polymers of ethylene can be prepared according to the process described and claimed in U.S. Patent 2,825,721, issued March 4, 1958, to J. P. Hogan et al. According to the process of said patent, 1-olefins having a maximum of 8 carbon atoms and no branching nearer the double bond than the 4-position are polymerized to form solid polymers in the presence of a liquid hydrocarbon diluent and a catalyst comprising chromium oxide and containing chromium in the hexavalent state, said chromium oxide being associated with at least one of silica, alumina, zirconia, or thoria. The polymerization is conducted at a temperature up to about 500° F. and a pressure sufficient to maintain the hydrocarbon diluent in the liquid phase. The solid polyethylene made according to the process of the above patent has a density of about 0.95 and a crystallinity at 25° C. of at least about 75 percent. The softening point of these linear polymers of ethylene will usually be in the range of about 250 to 325° F., the softening point being that temperature at which the polyethylene is sufficiently fluid to effect a weld when two pieces of the softened polyethylene are pressed together and allowed to cool.

The pipe welds made according to the method of this invention are stronger than the pipe itself as a result of the increased thickness of the pipe at the weld and because the bead on the outside surface of the pipe is streamlined with respect to the pipe surface while there is substantially no bead on the inside surface of the pipe.

Reasonable variations and modifications are possible within the scope of this disclosure without departing from the spirit and scope of the invention.

That which is claimed is:

1. The method of welding together joints of thermoplastic pipe which comprises forming a bevel of between about 20° and about 50° on the inside of each of the ends of the joints of pipe to be welded together; aligning the joints of pipe on a common axis; pressing the adjacent ends of pipe against a heated surface to soften the thermoplastic material and to cause it to flow to the periphery of the pipe; continuing to press the pipes against the heated surface until substanitally all of the beveled end of the pipe has been softened; removing the heated surface from between the adjacent ends of the pipes; pressing the adjacent ends of the pipes together; and confining the bead of softened thermoplastic material on the periphery of the pipe weld until the thermoplastic material has cooled to below its softening point.

2. The method of welding together joints of thermoplastic pipe which comprises forming a bevel on the inside of the ends of the joints of pipe to be welded; applying heat and pressure to the beveled ends of the pipe to cause the thermoplastic to soften and flow to the periphery of the pipes; terminating the application of heat; pressing the ends of the pipes together; and confining the softened material at the periphery of the joined pipes in the form of a bead free from sharp angles until the thermoplastic material has cooled to a temperature below its softening point.

3. In the method of welding together joints of thermoplastic pipe wherein the ends of the joints of pipe are heated to soften the thermoplastic material and the softened ends are pressed together until the thermoplastic material cools to below its softening point, the improvement which comprises forming a bevel on the inside of each of the ends of pipe to be joined so that the softened material flows to the periphery of the joint; and confining the softened material in a predetermined form during the period it is in the softened condition.

4. Apparatus for welding together joints of thermoplastic pipe comprising means to align the joints of pipe on a common axis; means to move one of said joints longitudinally with respect to the other joint; means to form a bevel on the inside of the ends of pipe to be welded together while in alignment; means to heat the ends of pipe while in alignment; and means to confine softened thermoplastic material about the periphery of the joined pipes to conform to a predetermined configuration.

References Cited in the file of this patent

UNITED STATES PATENTS

| | | |
|---|---|---|
| 2,361,636 | Koppel | Oct. 31, 1944 |
| 2,379,500 | Steffens | July 3, 1945 |
| 2,384,014 | Cutter | Sept. 4, 1945 |
| 2,438,685 | Stevens | Mar. 30, 1948 |
| 2,505,647 | Norris | Apr. 25, 1950 |
| 2,665,738 | Caskin | Jan. 12, 1954 |
| 2,684,603 | Schonberg | July 27, 1954 |
| 2,707,161 | Stern | Apr. 26, 1955 |